Sept. 20, 1971 G. L. BINGLE ET AL 3,605,247
WELDED CAGE PROCESS
Filed Sept. 9, 1968
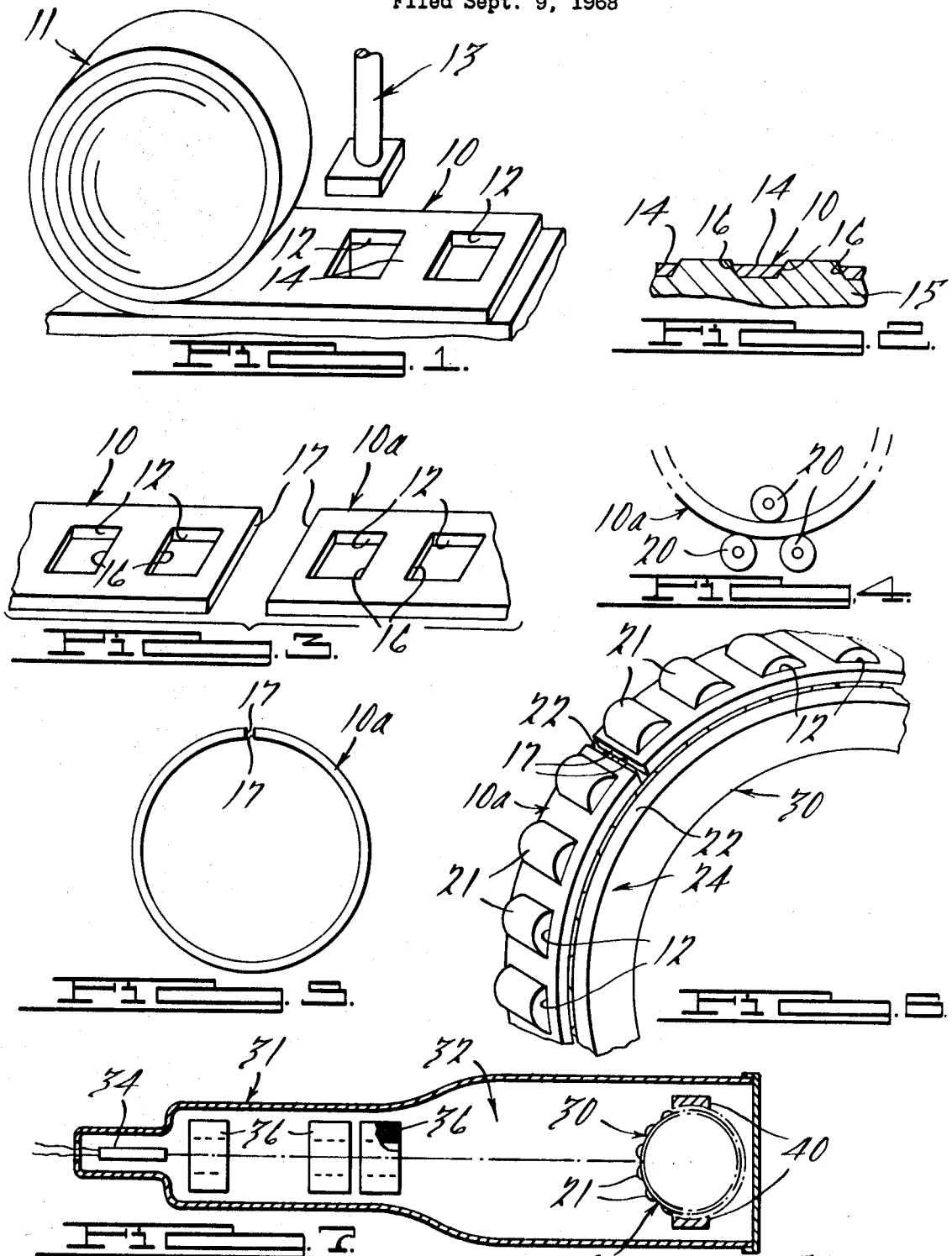
INVENTORS.
Gerald L. Bingle,
Henry G. Steil, Jr.,
Carl H. von Essen.
BY
Harness, Dickey-Pierce
ATTORNEYS

United States Patent Office 3,605,247
Patented Sept. 20, 1971

3,605,247
WELDED CAGE PROCESS
Gerald L. Bingle, St. Clair Shores, Henry G. Steil, Jr., Utica, and Carl A. von Essen, Westland, Mich., assignors to Federal-Mogul Corporation, Southfield, Mich.
Filed Sept. 9, 1968, Ser. No. 758,467
Int. Cl. B23k *31/02*
U.S. Cl. 29—477                                6 Claims

ABSTRACT OF THE DISCLOSURE

A process for making a cage for bearings in which the cage has a plurality of windows formed in a flat strip which is then cut to length and formed into a circular shape and welded by means of an electron beam.

---

The present invention relates to a method for making bearing cages.

In the past it has been proposed to make bearing cages by forming a plurality of windows in a flat strip of material, then rolling that strip into a circular shape and welding their ends together. In using conventional welding processes this has proved difficult since objectionable flash and splatter occur. With regard to welded cages it has been proposed to assemble the rollers and cage with a double shouldered race member with the cage being made of a split construction and then welding the ends of the cage while in assembly relationsip. Again the problem of flash and/or splatter has made such assembly techniques impractical and in one such method of assembly it was proposed to provide shields to protect the rollers from splatter, etc. In the present invention these problems have been eliminated and the welding is performed by a controlled electron beam which produces substantially no splatter and/or flash formation, and which provides a good welded joint. In this method shields or the like are not required; therefore, it is an object of the present invention to provide a new and improved method for making a bearing assembly.

It is another object of the present invention to provide a new and improved method for making a bearing cage from strip material.

It is another object of the present invention to make a bearing assembly including a bearing race having double shoulders utilizing a cage made from a flat strip which is formed into a circular shape and then welded by an electron beam.

It is still another object of the present invention to provide a novel method of making a circular cage from flat strip material utilizing electron welding.

Other objects, features, and advantages of the present invention will become apparent from the subsequent description and the appended claims, taken in conjunction with the accompanying drawings, in which:

FIGS. 1 through 7 illustrate the steps of the method of the present invention.

Looking now to the drawings, FIG. 1 shows the first step of the operation in which a flat strip 10 from a roll of strip stock 11 is blanked by a punch 13 to form a plurality of windows 12 which are of a size to receive a rolling element.

FIG. 2 depicts the next step of the operation in which the sides 16 of the ribs 14 between the adjacent pockets 12 are swaged by a tool 15 to form a chamfer or wedge shape to provide smooth bearing surfaces for the associated rollers and to provide dimensionally accurate pocket widths. In the next step (shown in FIG. 3) a strip 10a is cut off to length. The cut here is formed with precision such that ragged edges or tears are eliminated and the end 17 is substantially planar for substantially the full thickness of the stock. This is important since the surfaces at ends 17 will be abutting and the weld will be made therealong. In the next step, shown in FIG. 4, the strip 10a is rolled to a circular shape by means of a plurality of rollers 20 with the cut ends 17 located proximate to or abutting each other (see FIG. 5). The next step is shown in FIG. 6; a plurality of rollers 21 are assembled in a raceway between a pair of annular shoulders 22 of a race or ring member 24 with the retainer member (rolled strip) 10a retaining the rollers 21 in place and forming a bearing assembly 30. With a race member 24 having double shoulders 22, the assembly of rollers 21 into the raceway can be done normally only with cages in which the rollers can be snapped through the windows or in which a multiple piece retainer member is utilized and assembled after the rollers are in place. With the split ring 10a, the ring can be extended sufficiently so that the rollers 21 can be readily assembled to the race member 24. With the assembly in this condition, next the abutting or proximate ends 17 of the retainer 10a are welded.

As previously noted, in attempting welding with the past techniques, shielding, etc. is required to shield the remainder of the assembly from splatter, and hence possible damage to the assembly. It has been discovered that by welding with an electron beam the ends 17 can be secured together without splatter, etc. and hence without the need for shields or the like. In the next step, shown in FIG. 6, the assembly 30 is located within a vacuum chamber 32 which is a part of an electron welding assembly 31 including a cathode member 34 and appropriate focusing and deflecting coils 36. The chamber 32 is evacuated and the electron beam is directed against the abutting ends 17 of the retainer 10a. The beam emitted by the cathode 34 is controlled to scan the joint between the abutting ends 17 of the retainer 10a to form a weld therebetween. A fixture 40 holds the assembly 30 in alignment with the electron beam and alo holds the retainer 10a such that its ends 17 are positively in engagement to thereby assure a good weld. The planar surfaces at ends 17 assure good contact to further enhance the welding. With use of the apparatus shown, a good weld is provided without splatter and without the necessity of providing shielding, etc. and facilitates assembly in the manner as described. It has been found that to minimize splatter when a ferrous material is used for retainer 10a the material should be generally free of oxygen. Therefore, it has been found advantageous to use a de-oxidized ferrous material. In one form of the invention aluminum killed AISI 1010 steel was used with minimum splatter.

Note that while the joint was shown in the middle of a bridge portion 14, the joint could be provided in other locations. Also, with the above construction and technique, it will be possible to use a two-piece retainer and weld at two locations. The use of the two-piece retainer would further facilitate assembly of the rollers and retainer to a double shouldered race. The welding technique could be used to weld retainers alone and not in assembly with a race and rollers.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. The method of making a bearing assembly comprising the steps of: selecting strip stock of a deoxidized steel material; forming from the strip stock a blank having a plurality of windows separated by axially extending bars and shearing the blank from the remainder of strip stock; forming from the blank a circular blank having at least two free ends; assembling rollers and the circular blank to a bearing ring; and electron welding the free ends together along the width of the circular blank.

2. The method of claim 1 wherein the bearing ring is of a double shoulder construction and with the rollers being assembled into the raceway between the shoulders and into the windows by moving the free ends of the circular blank apart.

3. The method of claim 2 wherein the shearing step includes forming a substantially planar surface for substantially the full thickness of the stock.

4. The method of claim 3 comprising the step of electron welding the circular blank in a vacuum.

5. The method of claim 4 comprising the step of swaging the bars between windows to have a wedge shape.

6. The method of making a bearing assembly comprising the steps of: selecting strip stock of a deoxidized steel material; forming from the strip stock a blank having a plurality of windows separated by axially extending bars, shearing the blank from the remainder of strip stock, and forming a free end through one of said axially extending bars; forming from the blank a circular blank having at least two free ends through said axially extending bars; assembling rollers and the circular blank to a bearing ring; and electron welding the free ends together along the width of the circular blank.

References Cited

UNITED STATES PATENTS

| | | | |
|---|---|---|---|
| 3,033,974 | 5/1962 | Schleich et al. | 219—121EB |
| 3,529,122 | 9/1970 | Hinrichs | 219—121EB |
| 3,535,489 | 10/1970 | Hinrichs | 219—121 |
| 1,233,583 | 7/1917 | Knipe | 29—148.4 |
| 2,294,289 | 8/1942 | Frauenthal | 29—148.4 |
| 2,704,230 | 3/1955 | Roschlau | 29—148.4X |
| 3,159,911 | 12/1964 | Albert et al. | 29—477X |
| 3,423,819 | 1/1967 | Carlson et al. | 29—477X |

OTHER REFERENCES

"Materials Handbook," by G. S. Brady, published 1956, pp. 116–118.

JOHN F. CAMPBELL, Primary Examiner

R. B. LAZARUS, Assistant Examiner

U.S. Cl. X.R.

29—488; 219—121